United States Patent
Yen et al.

(10) Patent No.: US 9,465,382 B2
(45) Date of Patent: Oct. 11, 2016

(54) EMBEDDED SYSTEM, FOOL-PROOF CONTROL METHOD AND NON-TRANSITORY COMPUTER-READABLE STORAGE MEDIUM

(71) Applicant: INSTITUTE FOR INFORMATION INDUSTRY, Taipei (TW)

(72) Inventors: Chun-Tai Yen, Taipei (TW); Chih-Chiang Kao, Taoyuan County (TW); Chi-Chieh Peng, Kaohsiung (TW); Heng Lin, Yunlin County (TW); Hung-An Kao, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 487 days.

(21) Appl. No.: 14/133,717

(22) Filed: Dec. 19, 2013

(65) Prior Publication Data
US 2015/0148922 A1    May 28, 2015

(30) Foreign Application Priority Data
Nov. 25, 2013 (TW) .............................. 102142816 A (51) Int. Cl.
*G05B 19/414* (2006.01)
*G05B 19/406* (2006.01)

(52) U.S. Cl.
CPC ... *G05B 19/406* (2013.01); *G05B 2219/35285* (2013.01); *G05B 2219/36284* (2013.01)

(58) Field of Classification Search
CPC ................... G05B 19/406; G05B 2219/35285
See application file for complete search history.

(56) References Cited

U.S. PATENT DOCUMENTS

| 2008/0167839 A1 | 7/2008 | Miller |
| 2009/0089032 A1* | 4/2009 | Sturrock ................ G05B 17/02 703/7 |

(Continued)

FOREIGN PATENT DOCUMENTS

| TW | 200629117 A | 8/2006 |
| TW | I322741 | 4/2010 |

(Continued)

OTHER PUBLICATIONS

Taiwan Patent Office, Office action issued on May 8, 2015.
(Continued)

*Primary Examiner* — Kenneth M Lo
*Assistant Examiner* — Derrick Boateng
(74) *Attorney, Agent, or Firm* — Li & Cai Intellectual Property (USA) Office (57) ABSTRACT

An embedded system is disclosed. The embedded system is used for preventing a processing machine from an abnormal phenomenon when at least one processing parameter setting value is inputted into the processing machine. The embedded system is electrically connected to the processing machine, and the processing machine comprises an input interface, a first storing medium, a first controller and a stepper motor. The embedded system comprises a second storing medium and a second controller. The second controller captures the a processing parameter setting value inputted and compares it with a security range, so as to determine whether the processing machine is able to perform process for a workpiece. When the second controller determines that the processing machine is not able to perform process for the workpiece, a stop signal is generated and transmitted to the processing machine to stop performing process for the workpiece.

17 Claims, 5 Drawing Sheets

(56) References Cited

U.S. PATENT DOCUMENTS

| | | | | |
|---|---|---|---|---|
| 2010/0030348 A1* | 2/2010 | Scherer | ............ | G05B 19/4062 700/160 |
| 2011/0144774 A1* | 6/2011 | Scholte-Wassink | . | G05B 13/048 700/30 |
| 2011/0221377 A1* | 9/2011 | Ueno | ................ | G05B 19/4062 318/565 |

FOREIGN PATENT DOCUMENTS

| TW | I372321 | 9/2012 |
|---|---|---|
| TW | I395636 | 5/2013 |
| WO | WO2005/065884 | 7/2005 |

OTHER PUBLICATIONS

Wei-Chi Jhong, "NC Simulation and Collision Detection for Multiple-Axis Machining System", Master's Thesis, National Chung Cheng University, Jul. 27, 2009.

Yonghan Yan, "The Study of Monitoring of Abnormal Cutting Vibration and Non-iso-height 2D Contouring Error Measurement and Compensation Syatem for Micro-Milling" Thesis, Jul. 21, 2010.

You-Tern Tsai, et al., "A Study of Performance Defradation Predictions and Fault Diagnoses for Mechanical System", Sep. 30, 2012, Journal of Technology, vol. 27, No. 3, pp. 121-129.

* cited by examiner

EMBEDDED SYSTEM, FOOL-PROOF CONTROL METHOD AND NON-TRANSITORY COMPUTER-READABLE STORAGE MEDIUM

BACKGROUND

1. Technical Field

The instant disclosure relates to a fool-proof control for a processing machine; in particular, to an embedded system implementing a fool-proof control for a processing machine, a fool-proof control method for a processing machine and a non-transitory computer-readable storage medium.

2. Description of Related Art

The processing machine, particularly the machine tool with the Computer Numerical Control (CNC) has become a machine tool widely used in manufacturing kinds of machines and apparatuses. Traditionally, before the processing machine processes a workpiece, the processing machine needs to be loaded a processing procedure or the processing procedure of the processing machine needs to be edited, so as to go on the process. For a remote control of the machine tool, a manager would like to obtain the processing status and information of the processing machine from a remote platform, for example, whether the processing machine operates normally, whether there is certain abnormal signal, the information about the processing procedure, the machine utilization and the like.

In particular, when there are several processing machines in a factory, if the manager would like to obtain the real-time processing status and information of each processing machine, he needs to have a visit by himself or assign someone to the factory for watching over and recording the processing status and information, which is time consuming and inconvenient. If several processing machines are at different factories, it would become more time consuming and inconvenient. Thus, it becomes a trend in the future to control several processing machines via a remote platform. However, because there are lots and different kinds of processing machines, it is rather hard to directly connect the processing machine and the remote platform, and also not easy to directly control the processing machine via the remote platform. Therefore, it would be a rather effective solution to connect the processing machine and the remote platform via an embedded system.

In the prior art, the processing machine, such as the CNC machine, is a machine tool widely used in the industry circle. When operating the process, the CNC machine needs to be loaded with a processing procedure. For an operator who is watching over and operating the machine at the scene, he often needs to set and correct many kinds of parameters depending on the machine performance, such as the tool length, the turret parameter and kinds of offset values, etc. When the above processing procedure and kinds of practical parameters are completely loaded and set up, the operator can press the "start" button to process a workpiece. However, if there is some man-made operating error, such as loading error of the processing procedure and kinds of input errors of the practical parameters, it may result in the machine collision, the abnormal processing, or the tool damage.

Especially for the beginners and not experienced operators, it becomes difficult to notice the loading error of the processing procedure and kinds of input errors of the practical parameters. Once they press the "start" button to process a workpiece, it is very likely to result in the machine collision dramatically. If the above concerning happened, it not only would strongly affect the efficiency and production of the machine tool, but also would result in the damage of the workpiece, the tool, the turret and the like, which causes a waste of material, increases the processing cost, and consumes lots of time and a big amount of money, such as ten to hundred thousand New Taiwan Dollars to repair the machine tool. Also, it would become more serious to make people injured. Therefore, it turns a rather important issue in this industry to avoid the input error of the parameters.

SUMMARY

The instant disclosure is to provide a protecting mechanism of processing parameters, especially protecting mechanism of processing parameters with an embedded system which is not costly. The embedded system is connected to the processing machine so as to prevent a collision of machine or an abnormal phenomenon when processing due to an input error of the processing parameters.

The instant disclosure provides a fool-proof control method, used for preventing a processing machine from an abnormal phenomenon when at least one processing parameter setting value is input into the processing machine. An embedded system is electrically connected to the processing machine, and the processing machine comprises an input interface, a first storing medium, a first controller, and a stepper motor. The first storing medium stores and provides a processing procedure and the processing parameter setting value to the stepper motor such that the stepper motor starts to process according to the processing procedure and the processing parameter setting value provided. The input interface is used for setting the status information of the processing machine as a setting status and setting the status information as a processing state after the processing parameter setting value is input. The embedded system comprises a second storing medium and a second controller, and particularly the second storing medium is used for storing a security numerical range of the processing parameter setting value. The second controller is electrically connected to the second storing medium and the input interface. The fool-proof control method comprises following steps: capturing the status information via the second controller; capturing the processing parameter setting value input and comparing the processing parameter setting value with the security numerical range when the second controller determining that the status information is changed into the processing state; determining by the second controller whether the processing machine can process a workpiece; generating and transmitting a stop signal to the processing machine so as to stop processing the workpiece when the second controller determining that the processing machine can not process the workpiece via the processing procedure; and controlling the stepper motor by the first controller according to the processing procedure and the processing parameter setting value so as to process the workpiece when the second controller determining that the processing machine can process the workpiece via the processing procedure.

In an embodiment of the instant disclosure, the stop signal is transmitted to the input interface so as to change the status information from the processing state to the setting state.

In an embodiment of the instant disclosure, the security numerical range is generated via an expert system.

In an embodiment of the instant disclosure, by simulating according to the processing procedure and a plurality of simulation processing parameter values, when a processing simulation system determines it is safe for the processing machine to work, the security numerical range is generated by the processing simulation system according to the simulation processing parameter values.

In an embodiment of the instant disclosure, the second controller is further used for generating a processing parameter suggestion value satisfied within the security numerical range when determining the processing parameter setting value is not satisfied within the security numerical range, and transmitting the processing parameter suggestion value to the input interface for display.

In an embodiment of the instant disclosure, the second controller captures the status information of the processing machine according to a fixed frequency, obtains a plurality of status information in a sequence, and determines whether the status information is changed from the setting state to the processing state according to two status information which are sequential and latest. The second controller continues to capture the status information when determining the two sequential and latest status information are not changed from the setting state to the processing state.

In an embodiment of the instant disclosure, the embedded system further comprises an alarm unit. The alarm unit is electrically connected between the first controller and the second controller. In particular, the stop signal is transmitted to the alarm unit and the alarm unit sends an alarm signal to the first controller after receiving the stop signal such that the first controller controls the stepper motor so as to stop processing the workpiece.

In an embodiment of the instant disclosure, the processing machine further comprises an alarm unit. The alarm unit is electrically connected between the first controller and the second controller. In particular, the stop signal is transmitted to the alarm unit and the alarm unit sends an alarm signal to the first controller after receiving the stop signal such that the first controller controls the stepper motor so as to stop processing the workpiece.

In an embodiment of the instant disclosure, the security numerical range stored is updated via the Internet or intranet.

In an embodiment of the instant disclosure, the second storing medium stores the processing parameter setting values and the security numerical range corresponding via a processing parameter database.

In an embodiment of the instant disclosure, it is via a rule detection table of processing parameter to determine whether the security numerical ranges for each processing parameter in the processing parameter database are established.

The instant disclosure further provides an embedded system, used for preventing a processing machine from an abnormal phenomenon when at least one processing parameter setting value is input into the processing machine. The embedded system is electrically connected to the processing machine, and the processing machine comprises an input interface, a first storing medium, a first controller, and a stepper motor. The first storing medium stores and provides a processing procedure and the processing parameter setting value provided to the stepper motor such that the stepper motor starts to process according to the processing procedure and the processing parameter setting value provided. The input interface is used for setting the status information of the processing machine as a setting status and setting the status information as a processing state after the processing parameter setting value is input. The embedded system comprises a second storing medium and a second controller. The second storing medium is used for storing a security numerical range of the processing parameter setting value. The second controller is used for capturing the status information. When the second controller determines that the status information is changed into the processing state, the second controller captures the processing parameter setting value input and compares the processing parameter setting value with the security numerical range so as to determine whether the processing machine processes a workpiece. When the second controller determines to the processing machine can not process the workpiece via the processing procedure, the second controller generates and transmits a stop signal to the processing machine so as to stop processing the workpiece.

The instant disclosure further provides a non-transitory computer-readable storage medium, used for storing a computer program. The computer program comprises a plurality of codes to be loaded into an embedded system such that the embedded system implements a fool-proof control method used in a processing machine. In particular, the embedded system is electrically connected to the processing machine, and the processing machine comprises an input interface, a first storing medium, a first controller, and a stepper motor. The first storing medium stores and provides a processing procedure and the processing parameter setting value provided to the stepper motor such that the stepper motor starts to process according to the processing procedure and the processing parameter setting value provided. The input interface is used for setting the status information of the processing machine as a setting status and setting the status information as a processing state after the processing parameter setting value is input. The embedded system comprises a second storing medium and a second controller. The second storing medium is used for storing a security numerical range of the processing parameter setting value. The second controller is electrically connected to the second storing medium and the input interface. The fool-proof control method comprises following steps: capturing the status information via the second controller; capturing the processing parameter setting value input and comparing the processing parameter setting value with the security numerical range when the second controller determining that the status information is changed into the processing state; determining by the second controller whether the processing machine can process a workpiece; generating and transmitting a stop signal to the processing machine so as to stop processing the workpiece when the second controller determining the processing machine can not process the workpiece via the processing procedure; and controlling the stepper motor by the first controller according to the processing procedure and the processing parameter setting value so as to process the workpiece when the second controller determining the processing machine can process the workpiece via the processing procedure.

To sum up, in the embedded system, the fool-proof control method and the non-transitory computer-readable storage medium provided by the instant disclosure, the embedded system goes on the process of the security protecting mechanism when an operator is inputting the processing parameter setting value into a processing machine. Accordingly, it prevents the processing machine from an abnormal phenomenon, which efficiently reduces the possibility of damage for a workpiece to be processed and effectively increases the production efficiency.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

The instant disclosure provides a fool-proof control method, applied to an embedded system to control processing machines so as to prevent the processing machines from an abnormal phenomenon. When the operator is inputting processing parameter setting values, the embedded system starts the process of the security protection mechanism. In other words, the embedded system captures the processing parameter setting values, and before the processing machine starts to work the embedded system compares the processing parameter setting value with the security numerical range so as to make sure that the processing parameter setting value input by the operator is satisfied within the security numerical range. Accordingly, it can prevent the processing machine from an abnormal phenomenon, which efficiently reduces the possibility of damage for a workpiece to be processed and effectively increases the production efficiency.

The instant disclosure provides an embedded system with a low cost to have a fool-proof control for the processing parameters of the processing machine, which prevents the instability of the processing quality or the machine collision resulted from errors of the processing parameters. In addition, the instant disclosure can detect before the processing machine starts to process a workpiece so as to prevent the damage possibility of the workpiece.

The following instruction is to describe a fool-proof control method for the processing machine via a plurality of embodiments with corresponding drawings. However, the embodiments below are not for restricting the scope of the instant disclosure.

[One Embodiment of an Embedded System for a Fool-Proof Control of a Processing Machine]

Figure 1:
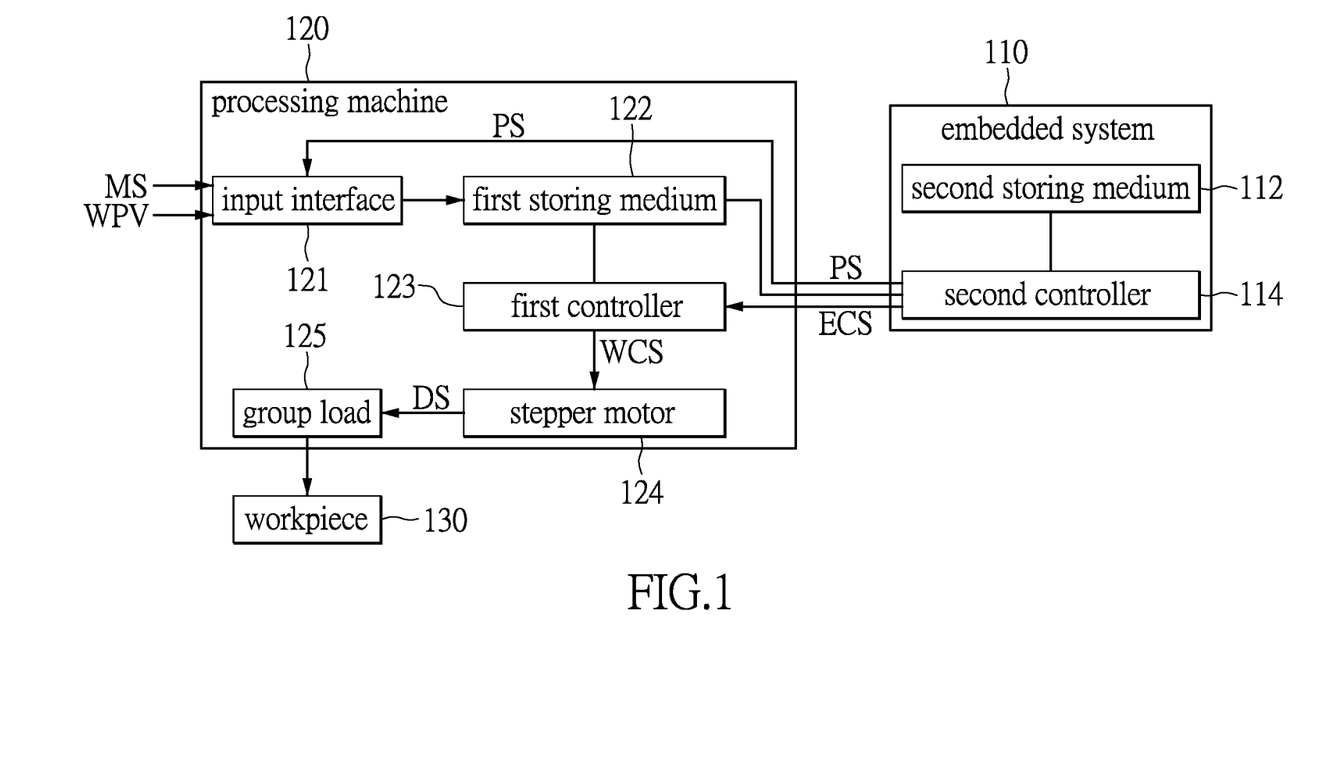
FIG. 1 shows a schematic block diagram of a embedded system and a processing machine using a fool-proof control method thereof according to an embodiment of the instant disclosure.

Please refer to FIG. 1. FIG. 1 shows a schematic block diagram of an embedded system and a processing machine using a fool-proof control method thereof according to an embodiment of the instant disclosure. In the present embodiment, an embedded system 110 is electrically connected to a processing machine 120, and the embedded system 110 is used for preventing the processing machine 120 from an abnormal phenomenon when at least one processing parameter setting value is input into the processing machine 120. The embedded system 110 comprises a second storing medium 112 and a second controller 114. The processing machine 120 comprises an input interface 121, a first storing medium 122, a first controller 123, a stepper motor 124 and a group load 125. The first storing medium 122 is electrically connected to the input interface 121, the first controller 123 is electrically connected to the first storing medium 122, and the stepper motor 124 is electrically connected to the group load 125. The second storing medium 112 is electrically connected to the second controller 114, and the second controller 114 is electrically connected to the input interface 121, the first storing medium 122 and the stepper motor 124.

In the present embodiment, the first storing medium 122 is used for storing a processing procedure and processing parameter setting values provided to the stepper motor 124 so as to process a workpiece according to the processing procedure and the processing parameter setting values. Particularly, the processing procedure is edited in advance by the programmer and stored in the first storing medium 122 of the processing machine 120. The first storing medium 122 may be a Mask ROM, an EPROM, an EEPROM or a Flash Memory. The input interface 121 is used for setting the status information of the processing machine 120 as a setting state by an operator, and after the operator inputs the processing parameter setting value the status information of the processing machine 120 is set as a processing state via the input interface 121. The input interface 121 may be a keyboard or a touch screen. Moreover, the second storing medium 112 is used for storing security numerical ranges of the processing parameter setting values. In the following description is a further instruction in the generation of the security numerical range. The second storing medium 112 may be a Mask ROM, an EPROM, an EEPROM or a Flash Memory. The second controller 114 captures the status information of the processing machine 120 via the first storing medium 122 so as to make a following decision determination.

Figure 2:
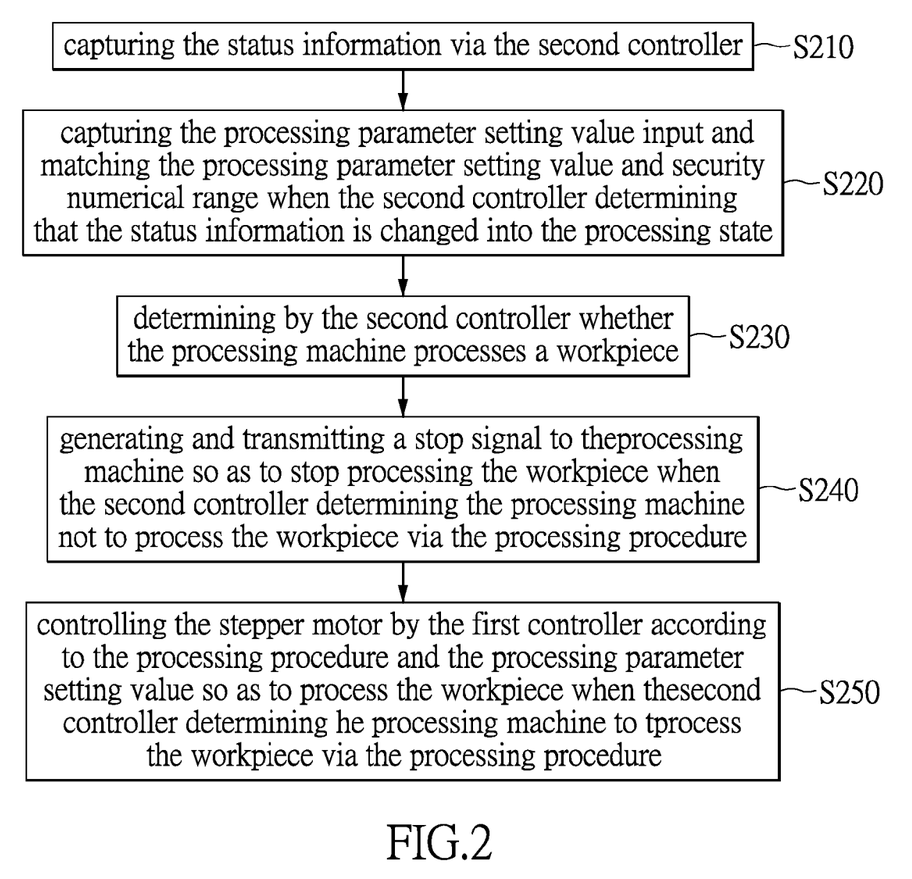
FIG. 2 shows a flow chart of a fool-proof control method according to an embodiment of the instant disclosure.

In conjunction with FIGS. 1 and 2, FIG. 2 shows a flow chart of a fool-proof control method according to an embodiment of the instant disclosure. The fool-proof control method provided by the instant disclosure comprises steps as below: capturing the status information via the second controller 114 (step S210); capturing the processing parameter setting value input and comparing the processing parameter setting value with the security numerical range when the second controller 114 determining that the status information is changed into the processing state (step S220); determining by the second controller 114 whether the processing machine 120 can process a workpiece 130 (step S230). When the second controller 114 determines that the processing machine 120 can not process the workpiece 130, a control signal ECS is generated and transmitted to the processing machine 120 so as to stop processing the workpiece 130. At this time, the control signal is considered a stop signal.

Furthermore, first, the status information of the processing machine is set as a setting state, and the operator inputs the processing parameter setting value WPV via the input interface 121 into the first storing medium 122. Afterwards, the operator inputs a state-changing command MS via the input interface 121 so as to change the status information of the processing machine 120 into a processing state. In the present embodiment, the processing parameters are for example the feed speed of the feed axes, the rotational speed of the main axis, the compensation of working coordinate, the correction for intercept, the processing compensation, the tool compensation, the actual feed speed and the like of the stepper motor 124, or the relative parameters of other apparatuses of the processing machine 120. After that, the embedded system 110 captures the status information of the processing machine 120. To be more specific, the second controller captures the status information of the processing machine 120 according to a fixed frequency, obtains a plurality of status information, and according to two sequential status information latest among the status information determines whether the status information is changed from a setting state to a processing state. When the second controller 114 determines that the two sequential and latest status information among the status information are not changed from a setting state to a processing state, the second controller 114 continues to capture the status information. In some embodiments, the second controller 114 can also capture the general parameters of the processing machine 120, such as the power-on time, the operating time, the absolute coordinate, the relative coordinate, the residual distance, the macro variable, the servo axis actual rotation-speed, the servo axis command rotation-speed and the percentage of servo axis rotation-speed, etc. In other embodiments, the status information may be one of the general parameters of the processing machine 120, and in particular after the second controller 114 captures the general parameters, the second controller 114 obtains the status information from the general parameters captured.

In practical applications of the processing machine 120, when the second controller 114 of the embedded system 110 determines that the status information of the processing machine 120 is changed from a setting state to a processing state, the second controller 114 captures the processing parameter setting value WPV input via the first storing medium 122 of the processing machine 120, and the second controller 114 compares the processing parameter setting value WPV with the security numerical range stored in the second storing medium 112, so as to determine whether the processing machine 120 can process a workpiece 130, in which the instruction of relevant details of generation of the security numerical range would be as follow. Afterwards, when the second controller 114 of the embedded system 110 determines that the processing machine 120 can not process the workpiece 130, the second controller 114 generates and transmits a control signal ECS to a first controller 123 of the processing machine 120 so as to instruct the processing machine 120 to stop processing the workpiece 130. Moreover, it is worth mentioning that, in one embodiment, when the second controller 114 determines that the processing parameter setting value WPV input by the operator is not satisfied within the security numerical range, the second controller 114 generates a processing parameter suggestion value which is satisfied within the (security numerical range according to the data stored in the second storing medium 112, and transmits a numerical suggestion signal including the processing parameter suggestion value to the input interface 121 so as to display the processing parameter suggestion value of the processing parameter on a display with the input interface 121. Accordingly, the operator operating the processing machine 120 is instructed to input the processing parameter setting value WPV satisfied within the security numerical range. In another embodiment, the second controller 114 transmits a stop signal to the input interface 121 of the processing machine 120 so as to change the status information of the processing machine 120 from a processing state to a setting state.

Moreover, when the second controller 114 determines that the processing machine 120 can process the workpiece 130, the first controller 123 transmits an operating signal WCS to control the stepper motor 124 according to the control signal ECS transmitted from the second controller 114 and the processing procedure and processing parameter setting value stored in the first storing medium 122, and the stepper motor 124 transmits a processing signal to the group load 125 according to the operating signal WCS so as to control the group load 125 and further process the workpiece 130.

Regarding the security numerical range, in one embodiment, the security numerical range of the processing parameter may be generated via an expert system, and each security numerical range of the processing parameter generated via an expert system is transmitted and stored in the second storing medium 112 of the embedded system 110. In another embodiment, the security numerical range of the processing parameter may be generated in advance via a processing simulation system. The processing simulation system makes a simulation according to the processing procedure and a plurality of simulation processing parameter values, and the processing simulation system may make a simulation processing parameter value which allows the processing machine 120 to process the workpiece 130 safely (for example, safe to prevent the machine collision) as a security parameter according to the simulation results. After that, the processing simulation system generates security numerical ranges of the processing parameters with a plurality of security parameters, and each security numerical range of the processing parameter is stored in the second storing medium 112 of the embedded system 110. In one embodiment, the security numerical range of the processing parameter may be input into the second storing medium 112 of the embedded system 110 by an experienced operator so as to make sure that it is safe for the processing machine 120 to process a workpiece.

Thus, for the beginners and not experienced operators, it becomes convenient to safely operate the processing machine, and they can notice whether there are loading errors of the processing procedure and kinds of input errors of the practical parameters the via an embedded system 110 with a low cost. Further, the instant disclosure can prevent the dramatic machine collision when the tool of the processing machine is fed. Comparing with the prior art, the instant disclosure would not have much waste of materials or a high processing cost, and would also reduce the repair cost of the processing machine (estimated as ten to hundred thousand New Taiwan Dollars).

For a specific instruction on an operation process of the fool-proof control method for the processing machine of the instant disclosure, there is at least one of the embodiments for a further instruction.

In the following embodiments, there are only parts different from embodiments in FIG. 1 described, and the omitted parts are indicated to be identical to the embodiments in FIG. 1. In addition, for an easy instruction, similar reference numbers or symbols refer to elements alike.

[Another Embodiment of a Fool-Proof Control Method for a Processing Machine]

Figure 3:
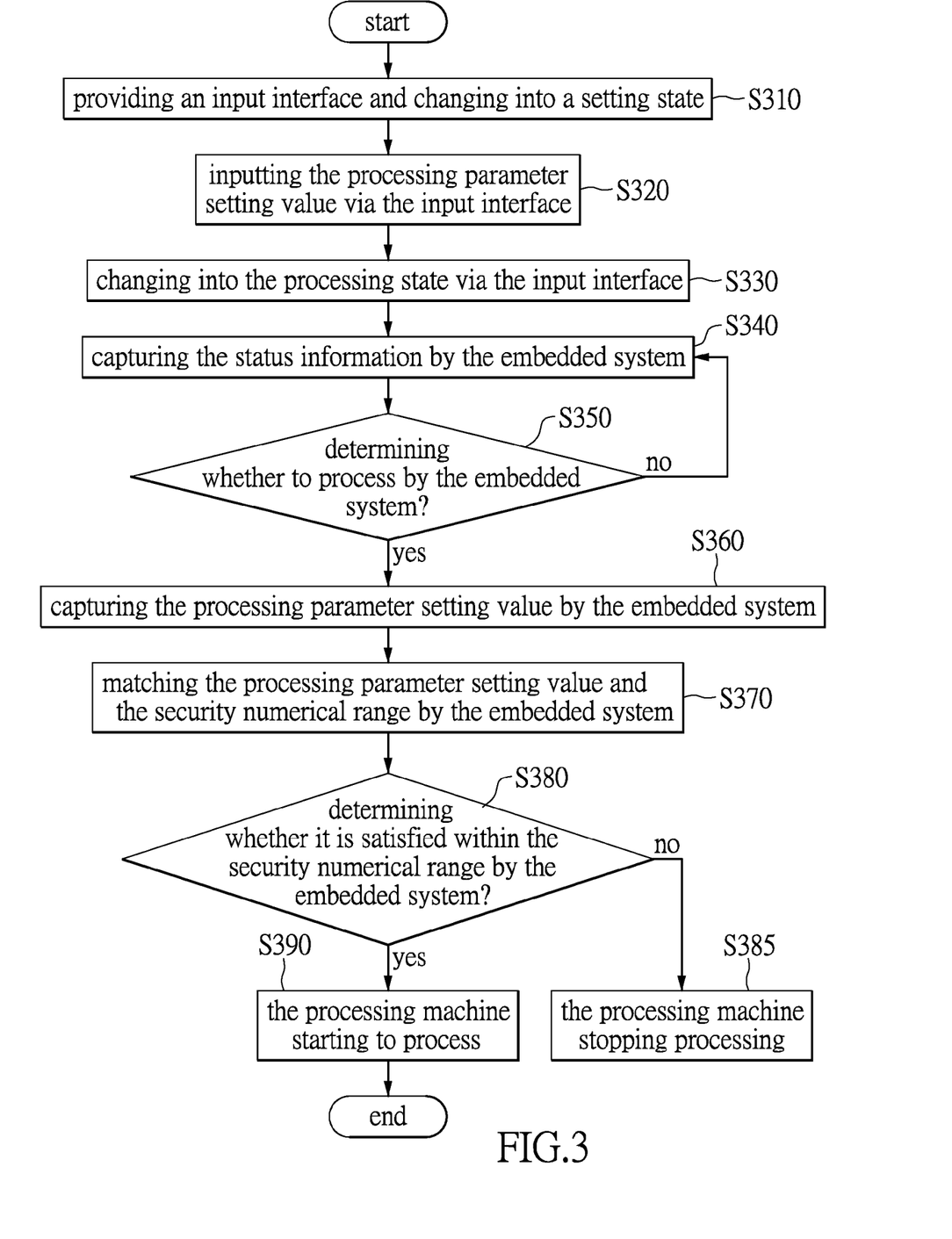
FIG. 3 shows a flow chart of a fool-proof control method according to another embodiment of the instant disclosure.

In conjunction with FIGS. 1 and 3, FIG. 3 shows a flow chart of a fool-proof control method according to another embodiment of the instant disclosure. In the present embodiment, the fool-proof control method comprises steps including the step S310 to the step S390. The following is the detailed instruction of each step of the fool-proof control method for a further understanding of the instant disclosure.

Step S310: providing an input interface 121 and changing into a setting state. In other words, the status information of the processing machine 120 would be a setting state first so as to wait for the operator to set the processing parameter setting value WPV of the processing machine 120.

Step S320: inputting the processing parameter setting value via the input interface 121. In other words, when the status information of the processing machine 120 is the setting state, the input interface 121 is provided to the operator to input at least one processing parameter setting value to the first storing medium 122.

Step S330: changing into the processing state via the input interface 121. In other words, the input interface 121 is provided to the operator, and after at least one processing parameter setting value is input into the first storing medium 122, the state-changing command MS changes the status information of the processing machine 120 from a setting state to a processing state.

Step S340: capturing the status information by the embedded system 110. In other words, when the processing machine 120 is in a processing state, the embedded system 110 captures the status information of the processing machine 120 as a processing state. In other embodiments, the status information is one of the general parameters of the processing machine 120, which means, the second controller 114 would capture values of the general parameters stored in the first storing medium 122, including the processing state, the power-on time, the operating time, the absolute coordinate, the relative coordinate, the residual distance, the macro variable, the servo axis actual rotation-speed, the servo axis actual rotation-speed and the percentage of servo axis rotation-speed. The embedded system 110 can capture the status information from the general parameters so as to determine whether it is the processing state.

Step S350: determining whether to process by the embedded system 110. In other words, the second controller 114 of the embedded system 110 according to the status information has a determination of the first level. That is, at this time, the second controller 114 would determine whether the processing machine 120 can process the workpiece 130. If the processing machine 120 still can not process the workpiece 130, it would come back to the step S340 of the fool-proof control method to continue capturing the status information. If the processing machine 120 can process the workpiece 130, it would come to the step S360 of the fool-proof control method to proceed to the following process.

Step S360: capturing the processing parameter setting value by the embedded system 110. In other words, when the second controller 114 of the embedded system 110 determines that the status information of the processing machine 120 is changed from the setting state to the processing state, the second controller 114 captures the processing parameter setting value WPV input via the first storing medium 122 of the processing machine 120.

Step S370: comparing the processing parameter setting value with the security numerical range by the embedded system 110. In other words, the second controller 114 compares the processing parameter setting value WPV with the security numerical range stored in the second storing medium 112. In the present embodiment, the security numerical range is generated by the processing simulation system. The processing simulation system makes a simulation according to the processing procedure and a plurality of simulation processing parameter value. The simulation processing parameter value generates the security numerical range of the processing parameter, which is safe for the processing machine 120 to process the workpiece 130 according to the simulation processing parameter value. Further, each of the security numerical range of the processing parameter is stored in the second storing medium 112 of the embedded system 110. Afterwards, it comes to the step S380 of the fool-proof control method.

Step S380: determining whether it is satisfied within the security numerical range by the embedded system 110. In other words, after the second controller 114 compares the processing parameter setting value WPV with the security numerical range stored in the second storing medium 112, the second controller 114 makes a decision determination. That is, the second controller 114 determines whether the processing machine 120 can process the workpiece 130. If the second controller 114 of the embedded system 110 determines that the processing machine 120 can not process the workpiece 130, it comes to the step S385 of the fool-proof control method. If the second controller 114 of the embedded system 110 determines that the processing machine 120 can process the workpiece 130, it comes to the step S390 of the fool-proof control method.

Step S385: the processing machine 120 stopping processing. In other words, if the second controller 114 of the embedded system 110 determines that the processing machine 120 can not process the workpiece 130, the second controller 114 generates and transmits a control signal ECS to the first controller 123 of the processing machine 120 so as to instruct the processing machine 120 to stop processing the workpiece 130. It is worth mentioning that, in one embodiment, when the second controller 114 determines that the processing parameter setting value WPV input by the operator is not satisfied within the security numerical range, the second controller 114 generates a processing parameter suggestion value satisfied within the security numerical range according to the data in the second storing medium 112, and transmits a numerical suggestion signal including the processing parameter suggestion value to the input interface 121 so as to display the processing parameter suggestion value of the processing parameter on a display (not shown) with the input interface 121 of the processing machine 120. Accordingly, the operator operating the processing machine 120 is instructed to correctly input the processing parameter setting value WPV satisfied within the security numerical range. Further, in another embodiment, the second controller 114 transmits a stop signal to the input interface 121 of the processing machine 120 so as to change the status information of the processing machine 120 from the processing state to the setting state. At this time, the stop signal is considered a state-changing signal.

Step S390: the processing machine 120 starting to process. In other words, when the second controller 114 determines that the processing machine 120 can process the workpiece 130, the first controller 123 transmits an operating signal WCS to control the stepper motor 124 according to the control signal ECS transmitted from the second controller 114 and the processing procedure and the processing parameter setting value stored in the first storing medium 122. The stepper motor 124 transmits a processing signal DS to the group load 125 according to the operating signal WCS so as to control the group load 125 and further to process the workpiece 130.

It is clarified that, a sequence of steps in FIG. 3 is set for a need to instruct easily, and thus the sequence of the steps is not used as a condition in demonstrating the embodiments of the instant disclosure.

For a specific instruction on an operation process of the fool-proof control method for the processing machine of the instant disclosure, there is at least one of the embodiments for further instruction.

In the following embodiments, there are only parts different from embodiments in FIG. 1 described, and the omitted parts are indicated to be identical to the embodiments in FIG. 1. In addition, for an easy instruction, similar reference numbers or symbols refer to elements alike.

[Another Embodiment of a Fool-Proof Control Method for a Processing Machine]

Figure 4:
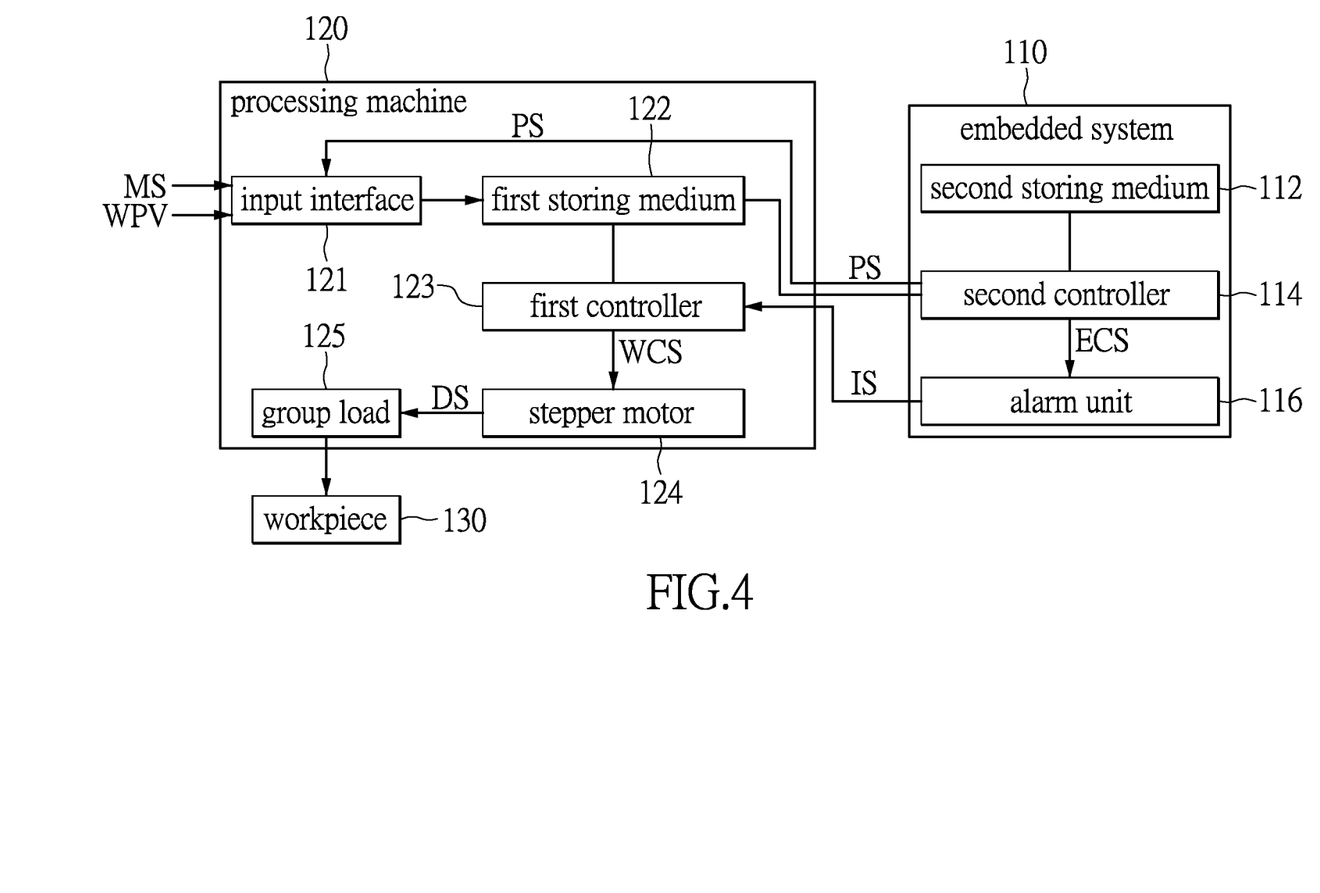
FIG. 4 shows a schematic block diagram of a embedded system and a processing machine using a fool-proof control method thereof according to another embodiment of the instant disclosure.

Please refer to FIG. 4, FIG. 4 shows a schematic block diagram of an embedded system and a processing machine using a fool-proof control method thereof according to another embodiment of the instant disclosure. In the present embodiment, the difference between the embodiment of FIG. 1 and the present embodiment is that the embedded system 110 in the present embodiment further comprises an alarm unit 116. The alarm unit 116 is electrically connected between the first controller 123 and the second controller 114. If the second controller 114 of the embedded system 110 determines that the processing machine 120 can not process the workpiece 130, the second controller 114 generates and transmits a control signal ECS (that is, a stop signal) to the alarm unit 116. Afterwards, the alarm unit 116 generates and transmits an alarm signal IS to the processing machine 120 so as to instruct the processing machine 120 to stop the stepper motor 124 processing the workpiece 130. In the other embodiments, the alarm unit 116 can be equipped with a LED alarming light or a buzzer, so as to remind the operator with a flash or a noise. Regarding relevant operation mechanism of the present embodiment of FIG. 4, it is identical to the embodiment in FIG. 1, and it is not repeated thereto.

[Another Embodiment of the Fool-Proof Control Method for the Processing Machine]

Figure 5:
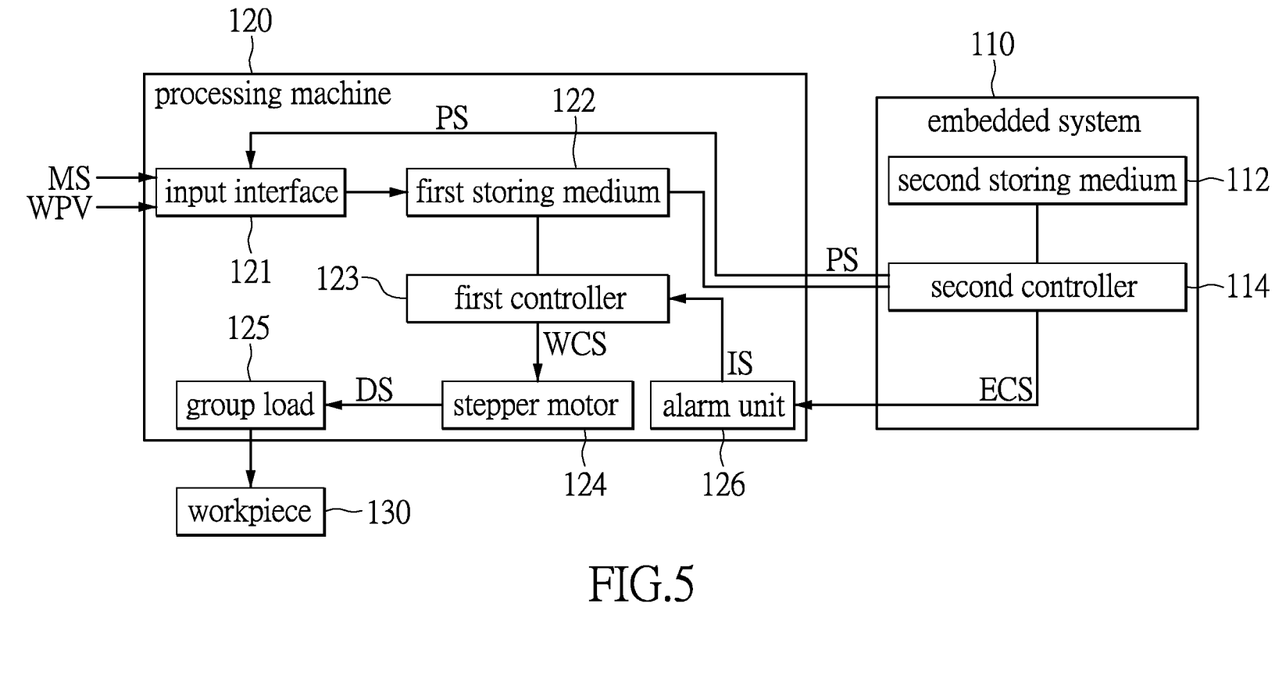
FIG. 5 shows a schematic block diagram of controlling a processing machine via an embedded system according to another embodiment of the instant disclosure.

Please refer to FIG. 5, FIG. 5 shows a schematic block diagram of controlling a processing machine via an embedded system according to another embodiment of the instant disclosure. In the present embodiment, the difference between the embodiment of FIG. 1 and the present embodiment is that the processing machine 120 in the present embodiment further comprises an alarm unit 126. The alarm unit 126 is electrically connected between the first controller 123 and the second controller 114. If the second controller 114 of the processing machine 120 determines that the processing machine 120 can not process the workpiece 130, the second controller 114 generates and transmits a control signal ECS (that is, a stop signal) to the alarm unit 126. Afterwards, the alarm unit 126 generates and transmits an alarm signal IS to the first controller 123 of the processing machine 120 to instruct the processing machine 120 so as to control the stepper motor 124 to stop processing the workpiece 130. In other embodiments, the alarm unit 126 can be equipped with a LED alarming light or a buzzer, so as to remind the operator with a flash or a noise. Regarding relevant operation mechanism of the present embodiment of FIG. 5, it is identical to the embodiment in FIG. 1, and it is not repeated thereto.

[One Embodiment of a Non-Transitory Computer-Readable Storage Medium]

For a further understanding of the instant disclosure, please refer to the embodiments of the FIGS. 1, 4 and 5. The instant disclosure further provides a non-transitory computer-readable storage medium. The non-transitory computer-readable storage medium is used for storing computer programs. The computer programs comprise a plurality of codes to be loaded into the embedded system 110 and making the embedded system 110 implement a fool-proof control method for the processing machine 120. In particular, the processing machine 120 is used for processing the workpiece 130, and the embedded system 110 is electrically connected to the processing machine 120. The processing machine 120 comprises an input interface 121, a first storing medium 122, a first controller 123, a stepper motor 124 and a group load 125. The first storing medium 122 stores the processing procedure and the processing parameter setting value provided to the stepper motor 124, and the stepper motor 124 can process the workpiece according to the processing procedure and the processing parameter setting value. The input interface 121 is used for setting the status information of the processing machine 120 as a setting state, and setting the status information of the processing machine 120 as a processing state after the processing parameter setting value WPV is input. The embedded system 110 comprises a second storing medium 112 and a second controller 114. The second storing medium 112 is used for storing the security numerical range of the processing parameter setting value WPV. The second controller 114 is used for capturing the status information of the processing machine 120. When the second controller 114 determines that the status information of the processing machine 120 is changed from the setting state to the processing state, the second controller 114 captures the processing parameter setting value WPV input, and compares the processing parameter setting value WPV with the security numerical range so as to determine that whether the processing machine 120 can process the workpiece 130. When the second controller 114 determines that the processing machine 120 can not process the workpiece 130, the second controller 114 generates and transmits a stop signal to the processing machine 120 so as to stop processing the workpiece 130. The fool-proof control method comprises steps as below: capturing the status information via the second controller 114; capturing the processing parameter setting value input and comparing the processing parameter setting value with the security numerical range when the second controller 114 determining that the status information is changed into the processing state; determining by the second controller 114 whether the processing machine 120 processes a workpiece 130; generating and transmitting a stop signal to the processing machine 120 so as to stop processing the workpiece 130 when the second controller 114 determining that the processing machine 120 can not process the workpiece 130; controlling the stepper motor 124 by the first controller 123 according to the processing procedure and the processing parameter setting value so as to process the workpiece 130 when the second controller 114 determining that the processing machine 120 can process the workpiece 130.

To sum up, in the embedded system, the fool-proof control method and the non-transitory computer-readable storage medium provided by the instant disclosure, the embedded system goes on the process of the security protecting mechanism when an operator is inputting the processing parameter setting value into a processing machine. Accordingly, it prevents the processing machine from an abnormal phenomenon, which dramatically reduces the possibility of damage for a workpiece to be processed and effectively increases the production efficiency. In addition, the instant disclosure can reduce the tool damage of the processing machine, the waste of material and the like, and can provide a safe working environment which avoids the worries about the machine collision resulted from an inappropriate operation. Moreover, the instant disclosure can detect in advance so as to reduce the repair cost of the processing machine and the damages caused by the production shut-down due to the repair. Also, the instant disclosure can maintain the normal production, automatically detect error and alarm, and reduce the safety accidents resulted in errors and carelessness when setting and operating.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

The descriptions illustrated supra set forth simply the exemplary embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A fool-proof control method, used for preventing a processing machine from an abnormal phenomenon when at least one processing parameter setting values is input into the processing machine, wherein an embedded system is electrically connected to the processing machine, the fool-proof control method comprising following steps:
    capturing a status information of the processing machine via a second controller of the embedded system;
    wherein the processing machine includes an input interface, a first storing medium, a first controller, and a stepper motor, the first storing medium storing and providing a processing procedure and at least one of the processing parameter setting values provided to the stepper motor such that the stepper motor starts to process according to the processing procedure and at least one of the processing parameter setting values provided, the input interface is used for setting the status information of the processing machine as a setting status and setting the status information as a processing state after at least one of the processing parameter setting values is input, the embedded system comprising a second storing medium and the second controller, wherein the second storing medium is used for storing a security numerical range of at least one of the processing parameter setting values, the second controller is electrically connected to the second storing medium and the input interface;
    capturing at least one of the processing parameter setting values input and comparing at least one of the processing parameter setting values with the security numerical range when the second controller determines that the status information is changed into the processing state; wherein the second controller captures the status information of the processing machine according to a fixed frequency, obtains a plurality of status information in a sequence, and determines whether the status information is changed from the setting state to the processing state according to two sequential and latest status information, the second controller continues to capture the status information when determining the two sequential and latest status information are not changed from the setting state to the processing state,
    determining by the second controller whether the processing machine can process a workpiece;
    generating and transmitting a stop signal to the processing machine so as to stop processing the workpiece when the second controller determines that the processing machine cannot process the workpiece via the processing procedure; and
    controlling the stepper motor by the first controller according to the processing procedure and at least one of the processing parameter setting values so as to process the workpiece when the second controller determines that the processing machine can process the workpiece via the processing procedure.

2. The fool-proof control method according to claim 1, wherein the stop signal is transmitted to the input interface so as to change the status information from the processing state to the setting state.

3. The fool-proof control method according to claim 1, wherein the security numerical range is generated via an expert system or is inputted manually into the second storing medium of the embedded system.

4. The fool-proof control method according to claim 1, wherein by simulating according to the processing procedure and a plurality of simulation processing parameter values, when a processing simulation system determines it is safe for the processing machine to work, the security numerical range is generated by the processing simulation system according to the simulation processing parameter values.

5. The fool-proof control method according to claim 1, wherein the second controller is further used for generating a processing parameter suggestion value satisfied within the security numerical range when determining at least one of the processing parameter setting values is not satisfied within the security numerical range, and transmitting the processing parameter suggestion value to the input interface for display.

6. The fool-proof control method according to claim 1, wherein the embedded system further comprises:
    an alarm unit, electrically connected between the first controller and the second controller, wherein the stop signal is transmitted to the alarm unit and the alarm unit sends an alarm signal to the first controller after receiving the stop signal such that the first controller controls the stepper motor so as to stop processing the workpiece.

7. The fool-proof control method according to claim 1, wherein the processing machine further comprises:
    an alarm unit, electrically connected between the first controller and the second controller, wherein the stop signal is transmitted to the alarm unit and the alarm unit sends an alarm signal to the first controller after receiving the stop signal such that the first controller controls the stepper motor so as to stop processing the workpiece.

8. The fool-proof control method according to claim 1, wherein the second storing medium stores at least one of the processing parameter setting values and the security numerical range corresponding via a processing parameter database.

9. An embedded system, used for preventing a processing machine from an abnormal phenomenon when at least one processing parameter setting value is input into the processing machine, wherein an embedded system is electrically connected to the processing machine, the embedded system comprising:
the processing machine includes an input interface, a first storing medium, a first controller, and a stepper motor, the first storing medium storing and providing a processing procedure and at least of the processing parameter setting value provided to the stepper motor such that the stepper motor starts to process according to the processing procedure and at least one of the processing parameter setting values provided, the input interface is used for setting the status information of the processing machine as a setting status and setting the status information as a processing state after at least one of the processing parameter setting values is input, the embedded system comprising a second storing medium and the second controller, wherein the second storing medium is used for storing a security numerical range of the processing parameter setting value, the second controller is electrically connected to the second storing medium and the input interface; and
a second storing medium, used for storing a security numerical range of at least one of the processing parameter setting values; and
a second controller, used for capturing the status information, when the second controller determining that the status information is changed into the processing state, the second controller capturing at least one of the processing parameter setting values input and comparing the processing parameter setting value at least one of the processing parameter setting values with the security numerical range so as to determine whether the processing machine can process a workpiece, when the second controller determines that the processing machine cannot process the workpiece via the processing procedure, the second controller generating and transmitting a stop signal to the processing machine so as to stop processing the workpiece;
wherein the second controller captures the status information of the processing machine according to a fixed frequency, obtains a plurality of status information in a sequence, and determines whether the status information is changed from the setting state to the processing state according to two sequential and latest status information, the second controller continues to capture the status information when determining that the two sequential and latest status information are not changed from the setting state to the processing state.

10. The embedded system according to claim 9, when the second controller determines the processing machine can process the workpiece via the processing procedure, the stepper motor is controlled by the first controller according to the processing procedure and at least one of the processing parameter setting values so as to process the workpiece.

11. The embedded system according to claim 9, wherein the stop signal is transmitted to the input interface so as to change the status information from the processing state to the setting state.

12. The embedded system according to claim 9, wherein the security numerical range is generated via an expert system or inputting manually into the second storing medium of the embedded system.

13. The embedded system according to claim 9, wherein by simulating according to the processing procedure and a plurality of simulation processing parameter values, when a processing simulation system determines it is safe for the processing machine to work, the security numerical range is generated by the processing simulation system according to the simulation processing parameter values.

14. The embedded system according to claim 9, further comprising:
an alarm unit, electrically connected between the first controller and the second controller, wherein the stop signal is transmitted to the alarm unit and the alarm unit sends an alarm signal to the first controller after receiving the stop signal such that the first controller controls the stepper motor so as to stop processing the workpiece.

15. The embedded system according to claim 9, wherein the processing machine further comprises:
an alarm unit, electrically connected between the first controller and the second controller, wherein the stop signal is transmitted to the alarm unit and the alarm unit sends an alarm signal to the first controller after receiving the stop signal such that the first controller controls the stepper motor so as to stop processing the workpiece.

16. The embedded system according to claim 10, wherein the second storing medium stores at least one of the processing parameter setting values and the security numerical range corresponding via a processing parameter database.

17. A non-transitory computer-readable storage medium, used for storing a computer program, the computer program comprising a plurality of codes to be loaded into an embedded system such that the embedded system implementing a fool-proof control method used in a processing machine, wherein the embedded system is electrically connected to the processing machine, the fool-proof control method comprising following steps:
capturing a status information of the processing machine via a second controller of the embedded system, wherein the processing machine includes an input interface, a first storing medium, a first controller, and a stepper motor, the first storing medium storing and providing a processing procedure and at least one of the processing parameter setting value provided to the stepper motor such that the stepper motor starts to process according to the processing procedure and at least one of the processing parameter setting provided, the input interface is used for setting the status information of the processing machine as a setting status and setting the status information as a processing state after at least one of the processing parameter setting is input, the embedded system comprising a second storing medium and the second controller, wherein the second storing medium is used for storing a security numerical range of at least one of the processing parameter setting, the second controller is electrically connected to the second storing medium and the input interface;
capturing the processing parameter setting value input and comparing the processing parameter setting value with the security numerical range when the second controller determines that the status information is changed into the processing state; wherein the second controller captures the status information of the processing machine according to a fixed frequency, obtains a plurality of status information in a sequence, and determines whether the status information is changed from the setting state to the processing state according to two sequential and latest status information, the second controller continues to capture the status information when determining the two sequential and latest status information are not changed from the setting state to the processing state, determining by the second controller whether the processing machine can process a workpiece;

generating and transmitting a stop signal to the processing machine so as to stop processing the workpiece when the second controller determines that the processing machine cannot process the workpiece via the processing procedure; and controlling the stepper motor by the first controller according to the processing procedure and the processing parameter setting value so as to process the workpiece when the second controller determines that the processing machine can process the workpiece via the processing procedure.

* * * * *